United States Patent [19]

Schmidt

[11] Patent Number: 4,982,878

[45] Date of Patent: Jan. 8, 1991

[54] SEALING METHOD AND CONTAINER ASSEMBLY WITH IMPROVED SEAL

[75] Inventor: Arno P. O. Schmidt, Abstatt, Fed. Rep. of Germany

[73] Assignee: Hilti Aktiengesellschaft, Fürstentum, Liechtenstein

[21] Appl. No.: 218,668

[22] Filed: Jul. 13, 1988

[30] Foreign Application Priority Data

Jul. 13, 1987 [DE] Fed. Rep. of Germany ....... 3723088

[51] Int. Cl.⁵ .......................... G01F 11/20; B05D 3/10
[52] U.S. Cl. .................................... 222/327; 427/230;
427/302; 427/337; 427/399; 427/400
[58] Field of Search ............... 427/399, 400, 337, 302; 222/327

[56] References Cited

U.S. PATENT DOCUMENTS 2,925,622  2/1960  Mahler ................................ 427/400

*Primary Examiner*—Janyce Bell
*Attorney, Agent, or Firm*—Toren, McGeady & Associates

[57] ABSTRACT

Containers which hold a flowable composition are sealed by applying a material which in contact with the flowable composition forms a protective sealing layer in the area requiring a seal. An improved container assembly is disclosed comprising a cartridge containing a flowable composition and a piston inserted into one end of the cartridge to express the flowable composition therefrom, wherein the gap between the cartridge and the piston is sealed by a protective layer produced by reaction of the flowable composition and material applied to the surface of the flowable composition.

19 Claims, 1 Drawing Sheet

SEALING METHOD AND CONTAINER ASSEMBLY WITH IMPROVED SEAL

BACKGROUND OF THE INVENTION

This invention is concerned with a method for sealing containers which are capable of being closed and which contain flowable compositions and is concerned also with a container assembly which includes a flowable composition and an improved seal therefor. More particularly, this invention relates to a method for establishing a sealing layer in a container for a flowable composition by application of material which causes the reaction of the flowable composition, whereby a protective coating is formed and to the resulting container assembly.

The storage and transport, as well as warehousing of reactive flowable compositions, such as compositions which may react in the presence of air or moisture, generally present no difficulties for a consumer, providing the compositions are contained in completely closed containers and the compositions in the containers may be partially used without substantial destruction of the remaining material. Generally, however, once the container of a composition which is sensitive to air or moisture has been opened, its contents must be used up at once.

Frequently, a consumer desires to use only part of the composition held in a container and it is desirable, particularly for moisture or air sensitive flowable compositions, to have a container which is closed in such a manner that the flowable composition does not become worthless after a single use. If for no other reason than cost, containers which are intended to hold materials such as adhesive compositions, paints, and the like for mass consumption cannot be expected to meet exact specifications for seal tightness as in the case, for example, of precision instruments.

Cartridges, which are used on a large scale in the engineering area and for home maintenance and which contain, for example, adhesive material such as mortar compositions, catalysts, etc., are particularly characteristic containers for flowable compositions which are sensitive to air or moisture. The cartridges generally have a hollow, cylindrical body into which plunges a piston which is capable of forcing the flowable composition out of the opposite end; the piston also has a sealing function. Such cartridges are intended for compositions which will be consumed only partially after each use. To apply the flowable composition, the piston is advanced in the cartridge and the corresponding amount of flowable composition is supplied to the desired area, usually through a spout-like or nozzle outlet on the opposite face of the cartridge.

For reasons of manufacture, the pistons of such known cartridges have a certain play within the cartridges and for ease of use, must have a certain play so that the frictional resistance does not become excessive. As a consequence, air can enter the flowable, viscous composition through the gap between the piston and the inner wall of the cartridge; eventually, due to the action of air and/or moisture, the contents of the cartridge usually become useless. In addition, the composition can flow to the outside through this gap.

The caulking tube disclosed by Robillard in U.S. Pat. No. 4,217,995, which is incorporated herein by reference, is an example of a container for a flowable composition which is sensitive to air and/or moisture, wherein the container is comprised of a cartridge and a piston. To seal the caulking tube against air and moisture, a moisture proof material such as polyethylene wax is coated on the inner surface of the rear end of the cartridge. This method of sealing a container for a flowable composition has not been found completely satisfactory.

Attempts to remedy problems of cartridge-piston type containers by means of sealing lips on the piston have also not led to satisfactory results. Either due to manufacturing tolerances, or the aging phenomena of the plastic used for the cartridge and/or piston, including shrinkage and embrittlement, the seal becomes unsatisfactory or frictional resistances are unreasonably high from a processing point of view.

SUMMARY OF THE INVENTION

It is an object of the invention to overcome technical problems associated with containers for flowable compositions which are sensitive to air or moisture in a simple and effective manner and at the same time to achieve further advantages.

Another object of the invention is an improved method for sealing containers which contain flowable compositions, so that the flowable compositions can be used over a period of time.

A further object of the invention is an improved method for sealing containers for flowable compositions which are sensitive to air or moisture.

A specific object of the invention is an improved assembly of the cartridge-piston type wherein the cartridge contains a flowable composition sensitive to air or moisture and wherein the gap between the piston and the cartridge is sealed in a simple and effective manner.

These and other objects are accomplished by the invention which includes a method for sealing a container comprising a flowable composition by applying material capable of causing the reaction of the flowable composition to the area of the container requiring a seal, whereby a chemical reaction of the flowable composition takes place which creates a sealing layer.

A particular embodiment of the invention is a closable container assembly comprising a cartridge containing a flowable composition and a piston inserted in one end of the cartridge capable of expressing the flowable composition through the opposite end of the cartridge, wherein a gap exists between the cartridge and the piston sufficient to allow the passage of air and the improvement comprises a protective sealing layer on the surface of the flowable composition normally in contact with the piston, wherein the protective sealing layer is produced by contact of the flowable composition with material applied thereto which is capable of causing the reaction of the flowable composition and thereby creating a protective layer effective to seal the gap between the cartridge and the piston and prevent the passage of air therethrough.

DETAILED DESCRIPTION OF THE INVENTION

Figure 1:
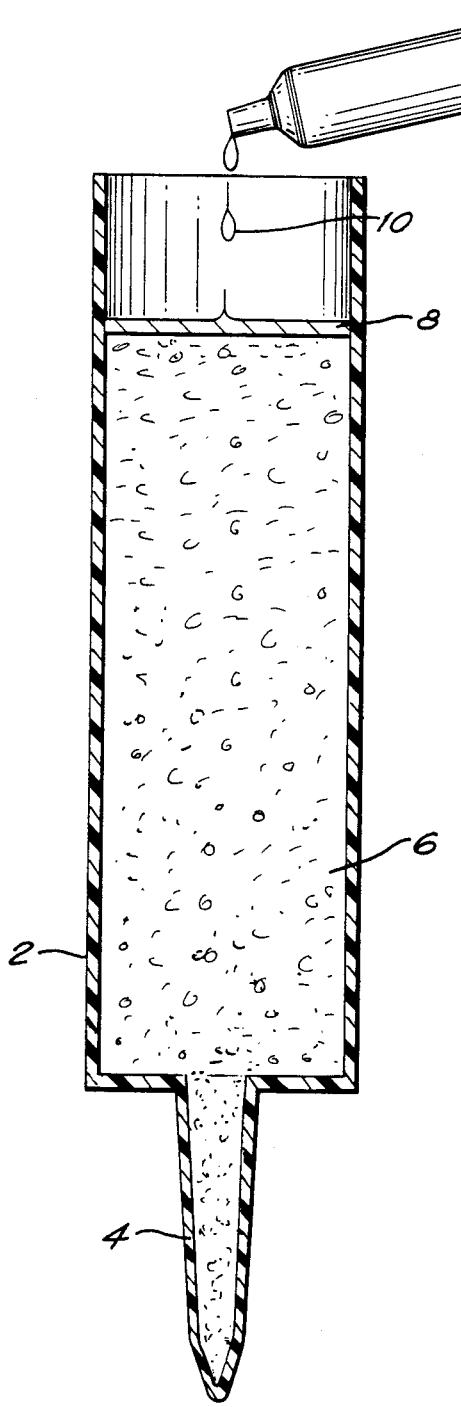
FIG. 1 is a cross-sectional view of a cartridge containing a flowable composition to which a material is being applied, which, in contact with the flowable composition is effective to cause a reaction and thereby the formation of a protective sealing layer, in accordance with one embodiment of the invention.

In accordance with the invention, material is applied to the flowable composition in the cartridge which establishes a sealing layer by chemical reaction, at least in those regions in which a lack of tightness is to be expected, such as the gap between the piston and inner wall of the cartridge. The material may be applied directly to the surface of the flowable composition or it may be applied to the face of piston which contacts the flowable composition.

The seal may be produced by applying material which induces the flowable composition to form a sealing layer in the contact area without actually entering the sealing layer itself, for example by application of a catalyst. Equally effective is applied material which contains or consists of a component which reacts or cooperates with a component of the flowable composition to produce a seal in the contact region.

According to a preferred embodiment of the invention, the flowable composition is a polymeric, curable composition and the material applied contains a component, preferably a reaction partner and/or curing catalyst, which effects the curing or polymerization of the flowable composition in the contact region. The term, "polymerization," is to be interpreted in the widest sense and includes polyaddition as well as polycondensation reactions. The same applies to the term, "curing," which is not limited to the concept of the duramer, but includes any solidification or cross-linking in the contact region which brings about the intended sealing effect.

Admittedly, the sealing film formed leads to an increase in the initial resistance, for example, when the container is opened or when the piston in the cartridge is advanced. However, the increased resistance is easily overcome, since in contrast to previous situations, the flowable composition has not experienced any reaction due to the action of air or moisture and therefore, no solidification and no increase in viscosity has occurred.

In accordance with another embodiment of the invention, the applied material is curable or polymerizable and the flowable composition contains a component which effects the curing; preferably a component of the flowable composition is a reaction partner and/or an appropriate catalyst for the applied material.

It has generally proven to be advantageous for the applied material to have a lower viscosity than the flowable composition. Usually the flowable composition is a highly viscous composition which contains a polymerizable and/or curable component, which is optionally in solution, for example in a reactive solvent.

Typical examples of flowable compositions include preparations from epoxy compounds, polyisocyanate compounds, polymerizable polyester compounds and polymerizable acrylate and methacrylate compounds.

The material to be applied is a resin-forming compound complementary to the above-mentioned flowable compositions or a curing agent therefor, which can initiate a free radical or ionic polymerizaion reaction Basically any type of two-component formulations which, when combined, form a coating which provides a protective sealing layer against air and moisture can be used in accordance with the invention.

If the flowable composition is an epoxide, the material to be applied may contain, for example polyamines, polyamides, polyaminoamides, acid anhydrides or the like. The reaction component, curing agent, or catalyst in the material to be applied may be diluted to the concentration desired for the particular application by the addition of low molecular weight or high molecular weight substances, particularly substances which give consistency and affect the mechanical values of the reaction product.

For a flowable composition which is a polyisocyanate, the applied material contains a reactant therefor, preferably a polyamine, polyamide, polyalcohol, polyester alcoholate, polyether alcoholate or other known reactant.

When the flowable composition is a polyaddition of polycondensation resin, the use of applied material which is or contains a reaction partner is indicated.

To modify the softness and tensile strength of the sealing layer, low molecular weight and high molecular weight substances may be added to the applied material. If a polymerization resin is used as the flowable composition, and a curing agent is present in the applied material, the effect of the curing agent may be adjusted by dilution with other reaction components in such a manner that progress of the polymerization is prevented after the sealing layer is formed. Provision also must be made to assure that all free radicals which are formed by the applied material are consumed or captured after the time required to form the sealing layer. Usually only a very small amount of material is applied, just enough to provide a protective sealing layer which is effective to prevent the penetration of air or moisture into the cartridge containing flowable composition after the piston has been inserted.

Figure 2:
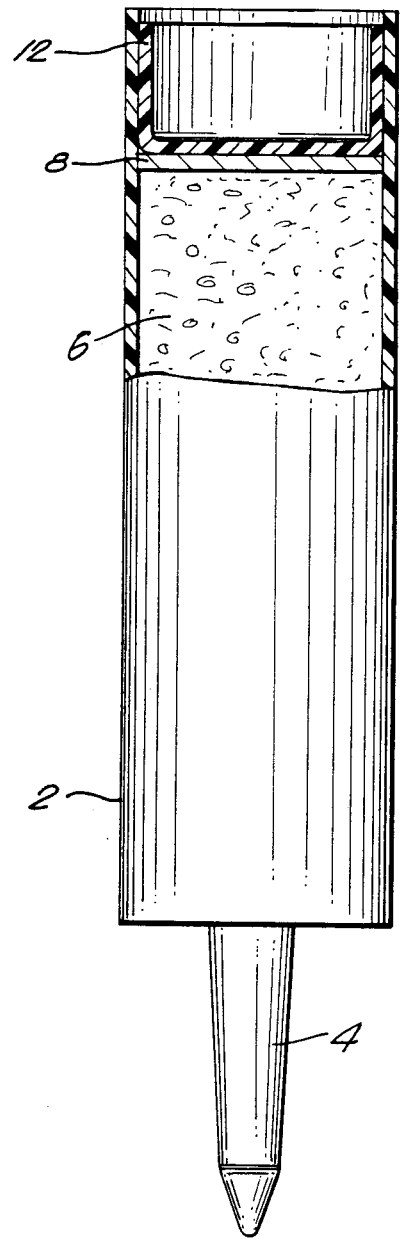
FIG. 2 is a side view of a container assembly of the invention with a partial cross-section of the rear end of the cartridge showing the protective sealing layer and piston in place.

With reference to the drawing, in FIG. 1, which illustrates the process of the invention, the cartridge 2 which has a nozzle 4 at one end is substantially filled with a flowable composition 6. To provide the sealing layer 8, a material 10 which causes a reaction when contacted with the flowable composition, either by supplying a reactant or a catalyst for reaction, is applied to the surface of the flowable composition as shown, whereby a protective sealing layer is formed. The piston 12 is then inserted as shown in FIG. 2.

The protective sealing layer formed in this way adapts to the cross section of the cartridge and provides an effective seal for the piston. The hard cover, or protective sealing layer which is formed by application of material described above to the surface of the flowable composition is moved forward together with the piston when the piston moves the mass through the nozzle.

While it has not been illustrated in the drawings, it is also feasible to apply material to the end face of the piston, so that a protective sealing layer is formed when the coating which has been applied to the end face of the piston contacts the flowable composition.

The following Examples further illustrate the invention, but must not be interpreted as limiting the invention in any manner.

EXAMPLES Example 1

A preferred use of the invention involves multicomponent adhesives. For these systems, the curing agent is generally in one cartridge and the resin in another. Within the meaning of the invention, both components are understood to be flowable compositions.

The resin contained in the first cartridge is composed of;
- 50% by weight of polyester resin
- 50% by weight of epoxide resin.

The curing agent in the second cartridge is composed of:
- 30% by weight of cellulose acetobutyrate
- 20% by weight of peroxide
- 50% by weight of filler.

The curing composition is applied to the surface of the resin in the first cartridge in an amount just sufficient to effect the curing of the surface layer of the resin and form a protective sealing layer thereon, which adapts to the configuration of the cartridge. A piston is inserted in the cartridge and lodged against the protective sealing layer, which provides effective sealing of the piston and a barrier against air and moisture.

For the curing agent in the second cartridge, either the resin composition present in the first cartridge is applied to form a protective sealing layer thereon or the following mixture is applied to the surface thereof:
- 25 parts by weight of unsaturated polyester resin
- 15 parts by weight polyvinyl acetate resin copolymer
- 10 parts by weight of vinyl chloride/vinyl isobutyl ether
- 2 parts by weight of a 10% solution of paraffin in styrene
- 48 parts by weight of methyl methacrylate.

Application of either of these resin mixtures to the surface of the curing agent in the second cartridge provides a protective sealing layer which is adapted to the cross-section of the cartridge and which provides excellent sealing of the piston.

Example 2

Another resin contained in a cartridge has the following composition:
- 65 parts by weight of epoxide resin
- 35 parts by weight of polyester resin.

A protective sealing layer is formed on the above resin by application of the following mixture to the surface thereof:
- 60 parts by weight of polyaminoamide
- 40 parts by weight of formamide.

A piston is then inserted into the cartridge and lodged against the resultant protective sealing layer, which provides effective sealing of the piston and protection of the contents of the cartridge against air and moisture.

What I claim is:

1. A method for sealing a container which is capable of being closed, but which does not contain an air-tight seal and which contains a flowable composition sensitive to air or moisture, comprising applying to the area of the container requiring a seal a material capable of causing a reaction with the flowable composition and by the reaction creating a protective layer on the flowable composition, whereby a protective sealing layer is formed when the flowable composition and the material applied are brought into contact which prevents air and moisture from reaching the flowable composition.

2. A method for sealing a container which is capable of being closed, but which does not contain an air-tight seal and which contains a flowable composition sensitive to air or moisture, comprising applying to the area of the container requiring a seal a material capable f causing a reaction with the flowable composition, wherein the flowable composition or the applied material is curable or polymerizable, whereby a protective sealing layer is formed when the flowable composition and the material applied are brought into contact which prevents air or moisture from reaching the flowable material.

3. The method of claim 2 in which the flowable composition is a polymerizable composition and the material applied contains a component capable of causing the flowable composition to polymerize.

4. The method of claim 2 in which the material applied contains a component capable of copolymerizng with the flowable composition.

5. The method of claim 2 in which the material applied contains a catalyst for the polymerization of the flowable composition.

6. The method of claim 2 in which the flowable composition is curable and the material applied contains a component capable of effecting the curing of the flowable composition.

7. The method of claim 2 in which the material applied is curable and the flowable composition contains a component capable of effecting the curing of the material applied.

8. The method of claim 1 in which the material applied has a lower viscosity than the flowable composition.

9. The method of claim 1 in which the flowable composition is highly viscous.

10. The method of claim 1, in which the container comprises a cartridge containing the flowable composition and a piston member inserted in one end of the cartridge capable of plunging into the cartridge to express the flowable material therefrom and in which material is applied to the surface of the flowable composition contained in the cartridge to form a protective sealing layer on the surface of the flowable composition which normally is in contact with the piston and then the piston is inserted, whereby the piston is sealed by the protective sealing layer formed by a reaction which occurs when the flowable composition is contacted with the applied material.

11. In a closable container useful for holding and applying a flowable composition which is sensitive to air or moisture, comprising a cartridge containing the flowable composition and a piston inserted in one end of the cartridge capable of plunging into the cartridge and expressing a flowable composition therefrom, the improvement comprising a protective sealing layer on the surface of the flowable composition normally in contact with the piston, wherein the protective sealing layer is produced by applying to the surface of the flowable composition and capable of causing a reaction with the flowable composition and thereby forming a protective layer effective to seal the cartridge and the piston and prevent air and moisture from passing into the cartridge.

12. In a closable container useful for holding and applying a flowable composition which is sensitive to air or moisture, comprising a cartridge containing the flowable composition and a piston inserted in one end of the cartridge capable of plunging into the cartridge and expressing a flowable composition therefrom, the improvement comprising a protective sealing layer on the surface of the flowable composition normally in contact with the piston, wherein the protective sealing layer is produced by applying to the surface of the flowable composition material capable of causing a reaction with the flowable composition and wherein the flowable composition or the applied material is curable or polymerizable, whereby a protective layer effective to seal the cartridge and the piston and prevent air and moisture from passing into the cartridge is formed.

13. The closable container according to claim 12, in which, the flowable composition is a polymerizable composition and the material applied contains a component capable of causing the flowable composition to polymerize.

14. The closable container according to claim 10, in which the material applied contains a component capable of copolymerizing with the flowable composition.

15. The closable container according to claim 12, in which the material applied contains a catalyst for the polymerization of the flowable composition.

16. The closable container according to claim 12, in which the flowable composition is curable and the material applied contains a component capable of effecting the curing of the flowable composition.

17. The closable container according to claim 12, in which the material applied is curable and the flowable composition contains a component capable of effecting the curing of the material applied.

18. The closable container according to claim 11, in which the material applied has a lower viscosity than the flowable compositon.

19. The closable container according to claim 11, in which the flowable composition is highly viscous.

* * * * *